United States Patent
Chen

(10) Patent No.: US 10,949,506 B2
(45) Date of Patent: Mar. 16, 2021

(54) METHOD AND SYSTEM FOR AUTHORIZING SOFTWARE IN ELECTRONIC DEVICE

(71) Applicant: Xiamen Sigmastar Technology Ltd., Xia'men (CN)

(72) Inventor: Lijing Chen, Shenzhen (CN)

(73) Assignee: XIAMEN SIGMASTAR TECHNOLOGY LTD., Xiamen (CN)

( * ) Notice: Subject to any disclaimer, the term of this patent is extended or adjusted under 35 U.S.C. 154(b) by 37 days.

(21) Appl. No.: 16/184,119

(22) Filed: Nov. 8, 2018

(65) Prior Publication Data
US 2019/0205506 A1 Jul. 4, 2019

(30) Foreign Application Priority Data
Dec. 29, 2017 (CN) .......................... 201711498764.8

(51) Int. Cl.
| | |
|---|---|
| G06F 21/12 | (2013.01) |
| H04N 21/41 | (2011.01) |
| H04L 29/08 | (2006.01) |
| H04N 21/6334 | (2011.01) |
| H04N 21/4223 | (2011.01) |

(52) U.S. Cl.
CPC ............ *G06F 21/121* (2013.01); *H04L 67/34* (2013.01); *H04N 21/4108* (2013.01); *H04N 21/4223* (2013.01); *H04N 21/63345* (2013.01); *G06F 2221/0773* (2013.01)

(58) Field of Classification Search
CPC .................. G06F 21/12; G06F 21/121; G06F 2221/0773; H04N 21/41; H04N 21/6334; H04N 21/4108; H04N 21/4223; H04N 21/63345; H04L 29/08; H04L 67/34
See application file for complete search history.

(56) References Cited

U.S. PATENT DOCUMENTS

| | | | | |
|---|---|---|---|---|
| 10,044,674 | B2* | 8/2018 | Liu | H04L 67/2809 |
| 10,631,040 | B2* | 4/2020 | Britt | H04N 21/2541 |
| 2007/0101403 | A1* | 5/2007 | Kubler | H04L 63/083 |
| | | | | 726/3 |
| 2012/0118947 | A1* | 5/2012 | Lyons | G07F 17/3241 |
| | | | | 235/375 |
| 2017/0094508 | A1* | 3/2017 | Felt | H04W 12/06 |
| 2018/0048640 | A1* | 2/2018 | Johansson | H04W 12/0608 |

* cited by examiner

*Primary Examiner* — Jayesh M Jhaveri
(74) *Attorney, Agent, or Firm* — WPAT, PC

(57) ABSTRACT

A method and system for authorizing software in an electronic device is provided. The electronic device has a unique identifier (UID) and is connected to a server of the software through a terminal device. The method includes: generating and transmitting at least one section of audio/video data embedded with the UID corresponding to the electronic device to the terminal device; uploading the audio/video data through the terminal device and sending an authorization request to the server of the software; returning authorization audio/video data from the server of the software through the terminal device, wherein the authorization audio/video data includes an authorization key corresponding to the electronic device; and enabling the electronic device to obtain the authorization audio/video data by means of audio/video communication, so as to obtain the authorization key and authorize the software in the electronic device.

21 Claims, 4 Drawing Sheets

METHOD AND SYSTEM FOR AUTHORIZING SOFTWARE IN ELECTRONIC DEVICE

This application claims the benefit of China application Serial No. 201711498764.8, filed Dec. 29, 2017, the subject matter of which is incorporated herein by reference.

BACKGROUND OF THE INVENTION

Field of the Invention

The invention relates to the technical field of computers, and more particularly to a method and a system for authorizing software in an electronic device.

Description of the Related Art

With the development of technologies and increasing demands of the people, electronic devices such as camera devices (e.g., cameras) and smart televisions have become indispensable tools in both daily life and work of the people.

As demands increase, user requirements on types and numbers of application software installed in an electronic device are also ever-expanding. System manufacturers of these electronic devices cannot independently complete the entire development of all kinds of software, and need further support from third-party applications.

However, the introduction of third-party applications frequently involves utilization authorization of software. Therefore, there is a need for a solution for authorizing a third-party application in an electronic device.

SUMMARY OF THE INVENTION

It is an object of the present invention to provide a method and a system for authorizing software in an electronic device, such that the electronic device can authorize software installed therein through audio/video data and the authorized software in the electronic device has uniqueness.

To achieve the above object, the present invention provides a method for authorizing software in an electronic device, which has a unique identifier (UID) and is connected to a server of the software through a terminal device. The method includes: generating at least one section of audio/video data to the terminal device, wherein the audio/video data is embedded with the UID corresponding to the electronic device; uploading the audio/video data and sending an authorization request to the server of the software through the terminal device, and returning authorization audio/video data from the server of the software through the terminal device, wherein the authorization audio/video data includes an authorization key corresponding to the electronic device and the authorization key is generated according to the authorization request and the audio/video data; and acquiring the authorization audio/video data through audio/video communication to obtain the authorized key so as to authorize the software in the electronic device.

To achieve the above object, the present invention further provides a system for authorizing software, wherein the system includes an electronic device without an Ethernet function, a terminal device having an Ethernet function and a server of the software, and the electronic device without an Ethernet function is installed with the software. When the system is to authorize the software installed in the electronic device without an Ethernet function, the system performs the following steps. The electronic device generates and sends at least one section of audio/video data to the terminal device, wherein the audio/video data is embedded with a unique identifier (UID) corresponding to the electronic device. Communication is performed with the server of the software through the terminal device to upload the audio/video data and to send an authorization request to the server of the software. Authorization audio/video data is returned from the server of the software through the terminal device, wherein the authorization audio/video data includes an authorization key corresponding to the electronic device, and the authorization key is generated according to the authorization request and the audio/video data. The electronic device acquires the authorization audio/video data through audio/video communication to obtain the authorization key so as to authorize the software in the electronic device.

The present invention provides the following effects. Different from the prior art, in the method for authorizing software in an electronic device of the present invention, a UID corresponding to the electronic device is embedded in audio/video data such that the server of the software generates an authorization key corresponding to the electronic device according to the audio/video data, allowing the electronic device to authorize the software in the electronic device according to the authorization key such that the software installed in the electronic device can be authorized. Meanwhile, because the authorization key corresponds to the UID of the electronic device, the authorization key has uniqueness with respect to the authorization of the software in the electronic device.

The above and other aspects of the invention will become better understood with regard to the following detailed description of the preferred but non-limiting embodiments. The following description is made with reference to the accompanying drawings.

DETAILED DESCRIPTION OF THE INVENTION

Specific details of the present invention are given in the description below to thoroughly understand the present invention. However, the present invention can be implemented by other methods different from those described below, and a person skilled in the art can make similar arrangements on the basis of the disclosure below without departing from the spirit of the present invention. That is, the present invention is not limited to the disclosure of the embodiments below.

The present invention provides a method and a system for authorizing software in an electronic device. The present invention is described in detail in the embodiments with the accompanying drawings below.

Figure 1:
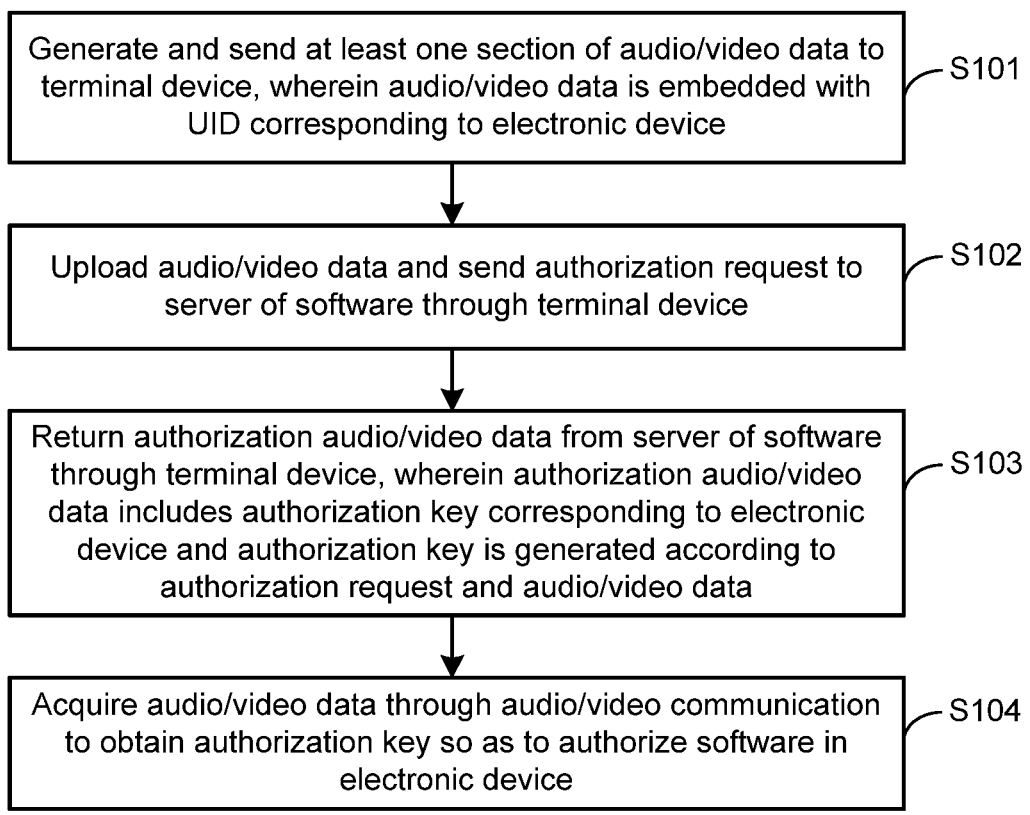
FIG. 1 is a flowchart of a method for authorizing software in an electronic device according to an embodiment of the present invention.

FIG. 1 shows a flowchart of a method for authorizing software in an electronic device according to an embodiment of the present invention.

The software to be authorized is an application installed in an electronic device, and more specifically, can be a third-party application developed by a third party other than a system manufacturer of the electronic device. In the embodiment, the software is installed in an electronic device, and can be used by a user only after having been authorized through a server corresponding to the software. Alternatively, the software has a trial period, and can only be continually used after having been authorized through a server of the software after the trial period expires. In some application scenarios, the electronic device is an electronic device without an Ethernet function. At this point, the electronic device cannot directly communicate with the server of the software to accomplish the authorization of the third-party application. Thus, another terminal device can be used to perform the authorization. It should be noted that, the terminal device is a device having an Ethernet function, e.g., a smart phone or a computer, such that the terminal device can communicate with the server of the software through the Ethernet so further assist the electronic device in authorizing the software.

The electronic device has a unique identifier (UID). More specifically, the UID may be a unique identifier of the electronic chip. The electronic device may be, for example, an electronic device at least capable of acquiring or playing audio data and/or video data, such as a video camera device (e.g., a video camera), a smart television, or a set-top-box (STB). The electronic device can be connected to a server of the software through a terminal device. The method includes the following steps.

In step S101, at least one section of audio/video data is generated and sent to the terminal device, wherein the audio/video data is embedded with a UID corresponding to the electronic device.

Figure 2:
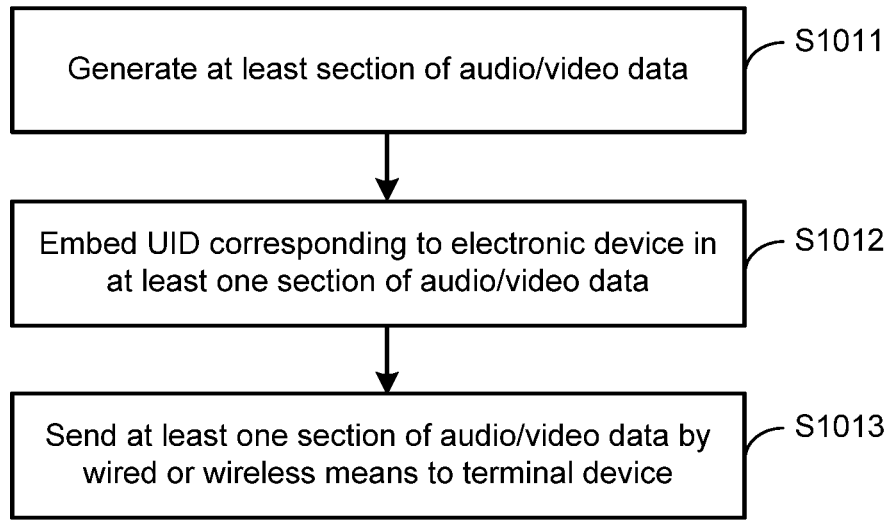
FIG. 2 is a flowchart of step S101 according to an embodiment of the present invention.

Referring to FIG. 2 showing a flowchart of step S101 according to an embodiment of the present invention, step S101 includes the following.

In step S1011, at least one section of audio/video data is generated. The at least one section of audio/video data may be audio data and/or video data captured or recorded by the electronic device, or audio data and/or video data processed and played by the electronic device. The audio/video data may be audio/video data exclusively configured for authorizing software in the electronic device, or audio/video data randomly recorded or played by the electronic device.

In step S1012, the UID of the electronic device is embedded in the at least one section of audio/video data.

The UID corresponding to the electronic device is embedded in the audio/video data, such that the UID corresponding to the electronic device can be acquired after processing the audio/video data during the authorization process. More specifically, the UID of the electronic device may be embedded in a section of audio/video data; alternatively, the UID may be distributively embedded in multiple sections of audio/video data if there are multiple sections of audio/video data, and associated details may be configured according to requirements. More specifically, the UID corresponding to the electronic device may be embedded by certain means in the corresponding audio/video data, for example, the UID of the electronic device may be added in form of an electrical signal to the audio/video data, thereby embedding the UID in the finally generated audio/video data.

In one embodiment, if the audio/video data is video data, supplementary enhancement information (SEI) (auxiliary information defined by the H.264 or H.265 protocol is SEI) may be added to the UID corresponding to the electronic device. The UID corresponding to the electronic device is for distinguishing different identifiers of other electronic devices producing audio/video data, e.g., an identifier (ID) of a device chip. If the audio/video data is audio signal, the audio signal is encoded into encoded audio data including the UID corresponding to the electronic device as the at least one section of audio/video data.

In step S1013, the at least one section of audio/video data is sent by a wired or wireless means to the terminal device. The electronic device is an electronic device without an Ethernet function. At this point, the electronic device cannot directly communicate with the server of the software to accomplish authorization of a third-party application. Thus, the authorization needs to be performed by another terminal device, and the at least one section of audio/video data is sent by a wired or wireless means to the terminal device. For example, the electronic device is a vehicle recorder having a data storage card, and the terminal device is a cell phone or computer capable of reading the data storage card; thus, the at least one audio/video data can be sent to the terminal device by a wired means, by means of reading the data storage card, or by means of Bluetooth.

In step S102, the audio/video data is uploaded through the terminal device and an authorization request is sent to the server of the software.

The server of the software refers to a server of software corresponding to the third-party and installed in the electronic device, and the user may access the server of the software through a device having an Ethernet function. More specifically, the audio/video data is uploaded to the server of the software by using a terminal device through the Ethernet. More specifically, the electronic device may send an authorization request to the server of the software through the terminal device, and after acquiring a response from the server of the software, the audio/video data is uploaded to the server of the software through a channel provided by the server of the software.

In step S103, authorization audio/video data is returned from the server of the software through the terminal device, wherein the authorization audio/video data includes an authorization key corresponding to the electronic device, and the authorization key is generated according to the authorization request and the audio/video data.

Further, after the server of the software receives the audio/video data, an authorization key corresponding to the UID of the electronic device may be generated by using a predetermined algorithm. The authorization key and the UID of the electronic device have a corresponding relationship, wherein each electronic device can correspond to only one authorization key or to multiple authorization keys. However, each authorization key can be applied to only one electronic device.

More specifically, the server of the software embeds the authorization key generated in one section of authorization audio/video data, wherein the authorization audio/video data may be any audio/video data, e.g., the audio/video data obtained from embedding the authorization key to the audio/video data uploaded to the server of the software, or may be audio/video data automatically generated according to the authorization key by the server of the software, and is not specifically defined herein.

In step S104, the authorization audio/video data is acquired by means of audio/video communication to obtain the authorization key, so as to authorize the software in the electronic device.

Figure 3:
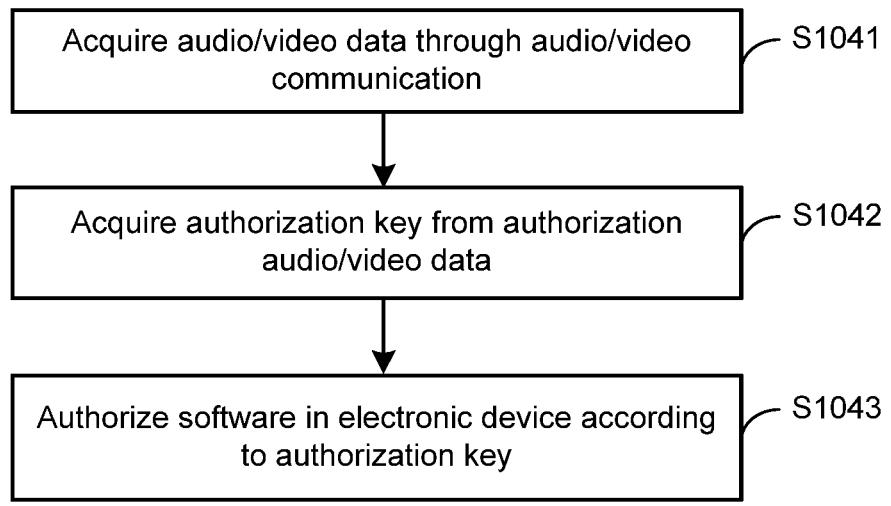
FIG. 3 is a flowchart of step S104 according to an embodiment of the present invention.

As shown in FIG. 3, FIG. 3 shows a flowchart of step S104 according to an embodiment of the present invention.

In step S1041, the authorization audio/video data is acquired by means of audio/video communication. The present invention does not specifically define the method for the audio/video communication, given that the authorization audio/video data can be acquired. For example, when the electronic device does not have an Ethernet function, a terminal device having an Ethernet function may be used to download the authorization audio/video data from the server of the software, and then transmit the downloaded authorization audio/video data to the electronic device or have the electronic device acquire the downloaded authorization audio/video data through other means. For example, when the authorization audio/video data is an image, the terminal device downloads the image from the server of the software and displays the image on the terminal device or prints out the image, and the electronic device can capture the image displayed on the terminal device or the image printed out to acquire the authorization audio/video data; when the authorization audio/video data is audio data, after the terminal device downloads the audio data through the Ethernet, the audio data can be played on the terminal device, and the electronic device further records the audio data played on the terminal device to accordingly acquire the authorization audio/video data.

In step S1042, the authorization key is acquired form the authorization audio/video data.

For example, when the authorization audio/video data is an image, the image is embedded with the authorization key corresponding to the UID of the electronic device. The authorization key is included in a certain form in the image, and can be acquired by the electronic device through further analysis, or can be directly presented in the image and be directly acquired by the electronic device. More specifically, the image may be an image having a two-dimensional code or a barcode, and the electronic device an acquire the authorization key therein by directly scanning the two-dimensional code or the barcode and further store the authorization key in a memory; alternatively, the image having the two-dimensional code or barcode can be captured, and the authorization key is obtained through automatic recognition and decoding and is then stored in a memory of the electronic device. In another application scenario, the authorization audio/video data is audio data, e.g., at least one section of music, and the authorization key corresponding to the UID of the electronic device is embedded into the audio data. Thus, the electronic device can acquire the authorization audio/video data after recording the audio data played on the terminal device, further process the authorization audio/video data to acquire the authorization key therein, and store the authorization key in a memory of the electronic device.

In step S1043, the software in the electronic device is authorized according to the authorization key.

More specifically, after acquiring the authorization key, the electronic device can store the authorization key in a non-volatile memory, e.g., a flash, or an electrically erasable programmable read-only memory (EEPROM). When the software runs, the UID of the electronic device of the electronic device is automatically read, and a check is performed according to a predetermined algorithm and the stored authorization key, and the software can be run normally only when the check is successful.

Through the above method, software installed in an electronic device can be authorized through audio/video data, and the authorization key is unique with respect to the authorization of the software in the electronic device as the authorization corresponds to the UID of the electronic device. Further, after the authorization, because a vendor of the electronic device or a vendor of a chip of the electronic device is unknowledgeable of the algorithm adopted by the third-party development vendor for generating the authorization key, the authorization key cannot be counterfeited. Meanwhile, even if the authorization key obtained by the electronic device from authorization of the server of the software is duplicated to another electronic device, due to different UIDs corresponding to different electronic devices and hence different corresponding authorization keys, the check correspondingly fails such that the corresponding software cannot be authorized. With the above method, the security in software authorization can be enhanced to further protect benefits of software development vendors.

In some application scenarios, the electronic device is an electronic device without an Ethernet function. At this point, the electronic device cannot directly communicate with the server of the software to accomplish the authorization for a third-party application. Therefore, another terminal device is needed for the authorization operation. It should be noted that, the terminal device is a device having an Ethernet function, e.g., a smart phone or a computer. Thus, the terminal device can communicate with the server of the software through the Ethernet to upload at the least one section of audio/video data embedded with the UID corresponding to the electronic device to the server of the software, and download the authorization audio data having the authorization key from the server of the software, thereby assisting the electronic device in authorizing the software.

For example, the electronic device may be a video camera device, and is specifically, for example, a monitoring video camera device of a security system or a common video camera. The video camera device does not have an Ethernet function, and cannot authorize the third-party application installed therein through the video camera device itself.

More specifically, the video camera device is a terminal device that can connect to an Ethernet function by a wired or wireless means, and first record at least one section of audio/video data through the video camera device when authorizing the third-party application, wherein the audio/video data is embedded with a UID of the camera video device. More specifically, the UID may be automatically embedded in the audio/video data when the video camera device records the audio/video data, or may be embedded in the audio/video data by further configuration and processing. Then, the at least one section of audio/video data recorded by the video camera device is acquired through the terminal device, more specifically, the audio/video data recorded by the video camera device can be transmitted to the terminal device through a connection therebetween.

Further, the video camera device may be connected by a wired or wireless means to a monitoring device to enable the monitoring device to acquire the audio/video data recorded by the video camera device. The monitoring device may be a monitoring host in a security system. Through the monitoring device, the audio/video data recoded by the video camera device is played through a display and/or a speaker. Then, the terminal device can further duplicate the audio/ video data played in the monitoring device to acquire the at least one section of audio/video data recorded by the video camera device.

After acquiring the audio/video data, the terminal device further sends an authorization request to the server of the software through the Ethernet, and uploads the audio/video data according to the feedback from the server of the software, such that the server of the software acquires the UID of the video camera device according to the received audio/video data. Next, the server of the software can generate an authorization key corresponding to the UID by adopting a predetermined algorithm and embed the authorization key to the at least one section of audio/video data, and the terminal device can then download the authorization audio/video data having the authorization key through the Ethernet.

In an application scenario, the authorization audio/video data is an image, which may be displayed on the terminal device or be printed out. At this point, the video camera device can capture the image displayed on the terminal device or printed out to acquire the authorization audio/video data. The image is embedded with the authorization key corresponding to the video camera device, and the authorization key is included in the image through a certain means, such that the authorization key can be acquired by the video camera device after further analysis, or be directly acquired by the video camera device by directly presenting the authorization key in the image. More specifically, the image may be an image having a two-dimensional code or a barcode, and the video camera device can acquire the authorization key therein by directly scanning the two-dimensional code or the barcode and further store the authorization key in a memory; alternatively, the image having the two-dimensional code or the barcode is captured, and the authorization key is acquired through automatic recognition.

In another application scenario, the authorization audio/video data is audio data, for example, at least one section of music. The audio data is embedded with the authorization key corresponding to the software in the video camera device, and the audio data can be played on the terminal device after the terminal device downloads the audio data through the Ethernet. The video camera device further records the audio data played on the terminal device to acquire the authorization audio/video data, and then processes the authorization audio/video data to acquire the authorization key therein and stores the authorization key to the memory.

The electronic device may be a smart television or an STB, and the television or the STB does not have an Ethernet function. The smart television or STB embeds a UID corresponding to the smart television or the STB in the audio/video data played by a television corresponding to the smart television or STB. More specifically, the smart television or STB can process the audio/video data before the smart television or a television corresponding to the STB plays the audio/video data so as to embed the corresponding UID, or can perform the embedding process during a playback process.

Further, the audio/video data played by the smart television or the television corresponding to the STB can be recorded to acquire the at least one section of audio/video data. Then, the terminal device communicates with the server of the software through the Ethernet to send an authorization request to the server of the software, and to upload the at least one section of audio/video data played by the smart television or the television corresponding to the television and recorded by the terminal device to the server of the software.

After receiving the authorization request and the audio/video data embedded with the UID of the electronic device, the server of the software generates an authorization key corresponding to the electronic device according to a predetermined algorithm, and further notifies a television program service provider to embed the authorization key in an audio/video data stream of a television program. After the smart television or STB receives the audio/video data stream of the television program pushed by the television program service provider, the authorization key is acquired from the audio/video data stream of the television program through analysis and processing, thereby authorizing the software in the electronic device.

In the above embodiment, a connection is established between an electronic device and a terminal device having an Ethernet function, and communication is performed with a server of software through the terminal device, enabling the server of the software to accomplish authorization on the software in the electronic device. Thus, authorization for software installed in an electronic device can still be accomplished when the electronic device does not have an Ethernet function.

Figure 4:
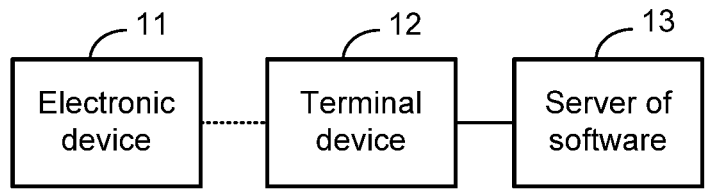
FIG. 4 is a block diagram of a system for authorizing software according to an embodiment of the present invention.
Figure 5:
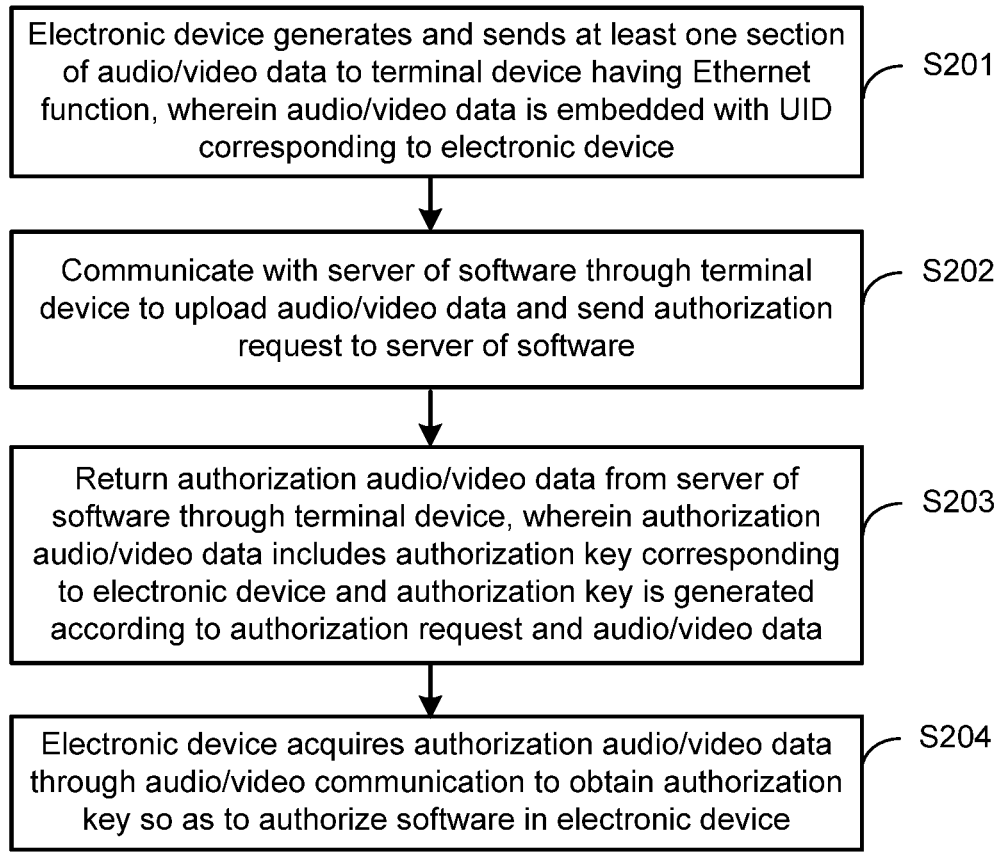
FIG. 5 is a flowchart of steps performed by a system for authorizing software according to an embodiment of the present invention.

Referring to FIG. 4 and FIG. 5, FIG. 4 shows a block diagram of a system for authorizing software according to an embodiment of the present invention, and FIG. 5 shows a flowchart of steps performed by the system for authorizing software.

The audio/video playback system includes: an electronic device 11 without an Ethernet function, a terminal device 12 having an Ethernet function, and a server 13 of software. The electronic device 11 without an Ethernet function and the terminal device 12 having an Ethernet function may be connected by a wired or wireless means therebetween, or the two do not have corresponding connection relationship therebetween. The terminal device 12 and the server 13 of the software are connected through Ethernet.

The electronic device 11 without an Ethernet function is built-in with the software, and the system performs the following when the system is to authorize the software built in the electronic device 11 without an Ethernet function.

In step S201, the electronic device 11 generates and sends at least one section of audio/video data to the terminal device 12 having an Ethernet function, wherein the audio/video data is embedded with a UID corresponding to the electronic device 11.

In step S202, communication is performed with the server 13 of the software through the terminal device 12 to upload audio/video data and to send an authorization request to the server 13 of the software.

In step S203, authorization audio/video data is returned from the server 13 of the software through the terminal device 12, wherein the authorization audio/video data includes an authorization key corresponding to the electronic device 11, and the authorization key is generated according to the authorization request and the audio/video data.

In step 204, the electronic device 11 acquires the authorization audio/video data through audio/video communication to acquire the authorization key so as to authorize the software in the electronic device 11.

The electronic device 11, the terminal device 12 and the server 13 of the software as well as the steps correspondingly performed by the system are similar to the details of the method for authorizing software in an electronic device and can be referred from the description of the in the foregoing embodiment, and are omitted herein.

It should be noted that, with the above method, the electronic device 11 is enabled to authorize the software installed therein through audio/video data, and the authorization key is unique with respect to the authorization of the software in the electronic device 11 as the authorization corresponds to the UID of the electronic device 11. Further, after the authorization, because a vendor of the electronic device 11 or a vendor of a chip of the electronic device is unknowledgeable of the algorithm adopted by the third-party development vendor for generating the authorization key, the authorization key cannot be counterfeited. Meanwhile, even if the authorization key obtained by the electronic device 11 from authorization of the server of the software is duplicated to another electronic device, due to different UIDs corresponding to different electronic devices and hence different corresponding authorization keys, the check correspondingly fails such that the corresponding software cannot be authorized. With the above method, the security in software authorization can be enhanced to further protect benefits of software development vendors.

Figure 6:
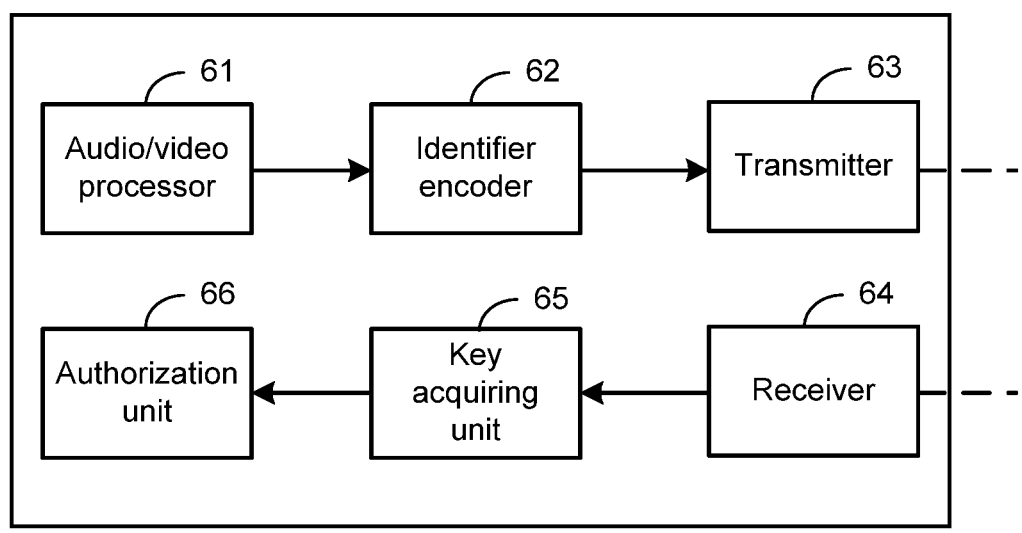
FIG. 6 is a block diagram of an electronic device 11 according to an embodiment of the present invention.

FIG. 6 shows a block diagram of the electronic device 11 according to an embodiment of the present invention. The electronic device 11 includes an audio/video processor 61, an identifier encoder 62, a transmitter 63, a receiver 64, a key acquiring unit 65 and an authorization unit 66. The audio/video processor 61, the identifier encoder 62 and the transmitter 63 are sequentially connected. The receiver 64, the key acquiring unit 65 and the authorization unit 66 are sequentially connected. The transmitter 63 and the receiver 64 are connected to the terminal device 12 by a wired or wireless means (refer to the terminal device 12 in FIG. 4).

The audio/video processor 61 is for generating at least one section of audio/video data, wherein the at least one audio/video data may be audio data and/or video data captured or recorded by the electronic device 11, or be audio data and/or video data played by the electronic device 11. The audio/video data may be audio/video data exclusively configured for authorizing software in the electronic device, or audio/video data randomly recorded or played by the electronic device 11.

The identifier complier 62 is for embedding the UID corresponding to the electronic device 11 in the at least one section of audio/video data. The audio/video data is embedded with the UID corresponding to the electronic device 11, such that the UID corresponding to the electronic device 11 can be acquired after processing the audio/video data during the authorization process. More specifically, the UID of the electronic device 11 may be embedded in a section of audio/video data; alternatively, the UID may be distributively embedded in multiple sections of audio/video data if there are multiple sections of audio/video data, and associated details may be configured according to requirements. More specifically, the UID corresponding to the electronic device 11 may be embedded by certain means in the corresponding audio/video data, for example, the UID of the electronic device 11 may be added in form of an electrical signal to the audio/video data, thereby embedding the UID in the finally generated audio/video data.

In one embodiment, if the audio/video data is video data, supplementary enhancement information (SEI) (auxiliary information defined by the H.264 or H.265 protocol is SEI) may be added to the UID corresponding to the electronic device 11. The UID corresponding to the electronic device is for distinguishing different identifiers of other electronic devices producing audio/video data, e.g., an identifier (ID) of a device chip. If the audio/video data is audio signal, the audio signal is encoded into encoded audio data including the UID corresponding to the electronic device 11 as the at least one section of audio/video data.

The transmitter 63 sends the at least one section of audio/video data by a wired or wireless manner to the terminal device 12. The electronic device 11 is an electronic device without an Ethernet function. At this point, the electronic device 11 cannot directly communicate with the server of the software to accomplish authorization of a third-party application. Thus, the authorization needs to be performed by the terminal device 12, and the at least one section of audio/video data is sent by a wired or wireless means to the terminal device 12. For example, the electronic device 11 is a vehicle recorder having a data storage card, and the terminal device 12 is a cell phone or computer capable of reading the data storage card; thus, the at least one audio/video data can be sent to the terminal device by a wired means, by means of reading the data storage card, or by means of Bluetooth.

With reference to FIG. 4, the terminal device 12 communicates with the server 13 of the software, uploads the at least one section of audio/video data to the server 13 of the software, and sends an authorization request to the server 13 of the software. The server 13 of the software generates an authorization key according to the authorization request and the at least one section of audio/video data, embeds the authorization key in one section of authorization audio/video data, and returns the authorization audio/video data back to the terminal device 12.

The electronic device 11 receives the authorization audio/video data by means of audio/video communication, decodes the authorization audio/video data to acquire the authorization key, and authorizes the software in the electronic device 11 by using the authorization key.

More specifically, the receiver 64 acquires the authorization audio/video data through audio/video communication; the present invention does not limit the audio/video communication of this embodiment, given that the electronic device 11 can acquire the authorization audio/video data. For example, when the electronic device 11 is without an Ethernet function, the terminal device 12 having an Ethernet function can download the authorization audio/video data from the server 13 of the software through the terminal device 12 having an Ethernet function, and the downloaded authorization audio/video data is then transmitted to the electronic device 11 or have the electronic device 11 acquire the authorization audio/video data by other means. For example, when the authorization audio/video data is an image, the terminal device 12 downloads the image from the server 13 of the software and displays the image on the terminal device 12 or prints out the image; the receiver 64 can capture the image displayed on the terminal device 12 or printed out to acquire the authorization audio/video data. When the authorization audio/video data is audio data, the terminal device 12 can download the audio data through the Ethernet and play the audio data on the terminal device 12, and the receiver 64 further records the audio data played on the terminal device 12 to acquire the authorization audio/video data.

The key acquiring unit 65 acquires the authorization key from the authorization audio/video data. For example, when the authorization audio/video data is an image, the image is embedded with the authorization key corresponding to the UID of the electronic device 11, and the authorization key is included in the image through a certain means, such that the key acquiring unit 65 can acquire the authorization key after obtaining and further analyzing the image, or can acquire the authorization key by directly displaying the authorization key on the image. More specifically, the image may be an image having a two-dimensional code or a barcode, and the receiver 64 can acquire the authorization key therein by the key acquiring unit 65 through directly scanning the two-dimensional code or the barcode, and store the authorization key in a memory (the memory is not shown in FIG. 6 because the memory can be provided in the electronic device 11 or outside the electronic device 11); alternatively, the image having the two-dimensional code or the barcode can be captured, and the authorization key can be acquired through automatic recognition and decoding and be stored in a memory of the electronic device 11. In another application scenario, the authorization audio/video data may be audio data, e.g., at least one section of music, and the authorization key corresponding to the UID of the electronic device 11 is embedded into the audio data. Thus, the receiver 64 can acquire the authorization audio/video data after recording the audio data played on the terminal device 12, and the key acquisition unit 64 can process the authorization audio/video data to acquire the authorization key therein and store the authorization key in a memory of the electronic device 11.

In one embodiment, the electronic device 11 without an Ethernet function is a video camera device.

The video camera device can be connected to the terminal device 12 by a wired or wireless means to enable the terminal device 12 to acquire the at least one section of audio/video data recorded by the video camera device. Alternatively, the video camera device is connected by a wired or wireless means to a enable the monitoring device to acquire the audio/video data recorded by the video camera device, and the terminal device can further duplicate the audio/video data played in the monitoring device to acquire the at least one section of audio/video data recorded by the video camera device.

The terminal device 12 receives the authorization audio/video data sent from the server 13 of the software, and the authorization audio/video data is an image having a two-dimensional code or a barcode. After the image is displayed on the terminal device 12 or is printed out, the video camera device captures the image displayed on the terminal device 12 or printed out to acquire the authorization key.

In one embodiment, the electronic device 11 without an Ethernet function is a smart television or an STB, wherein the UID corresponding to the smart television or the STB is embedded in audio/video played by the smart television or a television corresponding to the STB.

Further, the terminal device 12 can record the audio/video data played by the smart television or the television corresponding to the STB to acquire the at least one section of audio/video data generated by the electronic device 11. Then, after the at least one section of audio/video data generated by the electronic device 11 and recorded by the terminal device 12 and the authorization request are uploaded to the server 13 of the software by the terminal device 12, the server 13 of the software generates the authorization key corresponding to the electronic device 11 according to the authorization request and the audio/video data, and notifies a television program service provider to embed the authorization key in an audio/video data stream of a television program. After the smart television or STB receives the audio/video data stream of the television program pushed by the television program service provider, the authorization key is acquired from the audio/video data stream of the television program through analysis and processing, thereby authorizing the software in the smart television or the STB.

More specifically, the electronic device 11 without an Ethernet function is a video camera device or a smart television; alternatively, when the electronic device 11 is an STB, specific details for authorizing software are similar to the implementation details of a method for authorizing software in an electronic device of the present invention and can be referred from the foregoing embodiments, and are omitted herein.

Through the above method, a connection is established between the electronic device 11 and the terminal device 12 having an Ethernet function, and communication is performed with the server 13 of software through the terminal device 12, enabling the server 13 of the software to accomplish authorization on the software in the electronic device 11. Thus, software of a third-party program installed in an electronic device 11 can still be accomplished when the electronic device 11 does not have an Ethernet function.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A method for authorizing software in an electronic device, the electronic device having a unique identifier (UID) and the software, the electronic device without an Ethernet function and connected to a server of the software through a terminal device having the Ethernet function, the method comprising:
   recording audio/video data, by the electronic device;
   generating and sending, by the electronic device, at least one section of the audio/video data comprising the UID to the terminal device, wherein the audio/video data is embedded with the UID corresponding to the electronic device;
   uploading the at least one section of audio/video data and sending an authorization request through the terminal device to the server of the software;
   returning authorization audio/video data from the server of the software through the terminal device, wherein the authorization audio/video data comprises an authorization key corresponding to the electronic device, and the authorization key is generated according to the authorization request and the audio/video data;
   acquiring, by the electronic device, the authorization audio/video data through audio/video communication to acquire the authorization key, and authorizing the software in the electronic device.

2. The method according to claim 1, wherein the electronic device is an electronic device without an Ethernet function.

3. The method according to claim 2, wherein the electronic device is a video camera device.

4. The method according to claim 3, wherein the video camera device is connected by a wired or wireless means to the terminal device, so as to enable the terminal device to acquire the at least one section of audio/video data recorded by the video camera device.

5. The method according to claim 3, wherein the video camera device is connected by a wired or wireless means to a monitoring device to enable the monitoring device to acquire the audio/video data recorded by the video camera device, and the terminal device re-records audio/video played by the monitoring device to acquire the at least one section of audio/video data recorded by the video camera device.

6. The method according to claim 4, wherein the terminal device is a device having an Ethernet function, the terminal device communicates with the server of the software through the Ethernet function, so as to upload the at least one section of audio/video data recorded by the video camera and the authorization request to the server of the software, and to download the authorization audio/video data having the authorization key from the server of the software.

7. The method according to claim 5, wherein the terminal device is a device having an Ethernet function, the terminal device communicates with the server of the software through the Ethernet function, so as to upload the at least one section of audio/video data recorded by the video camera and the authorization request to the server of the software, and to download the authorization audio/video data having the authorization key from the server of the software.

8. The method according to claim 6, wherein the authorization audio/video data is an image to be displayed on the display device or to be printed out; and the video camera device captures the image displayed on the terminal device or printed out to acquire the authorization audio/video data.

9. The method according to claim 8, wherein in the image is an image having a two-dimensional code or a barcode.

10. The method according to claim 6, wherein the authorization audio/video data is audio data to be played on the terminal device; and the video camera records the audio data played on the terminal device to acquire the authorization audio/video data.

11. The method according to claim 1, wherein the software is a third-party application.

12. The method according to claim 2, wherein the electronic device is a smart television or a set-top box (STB), and the smart television or the STB embeds the UID corresponding to the smart television or the STB in audio/video played by the smart television or a television corresponding to the STB.

13. The method according to claim 12, wherein the terminal device records the audio/video played by the smart television or the television corresponding to the STB to acquire the at least one section of audio/video data.

14. The method according to claim 13, wherein the terminal device is a device having an Ethernet function, the terminal device communicates with the server of the software through the Ethernet function, so as to upload the at least one section of audio/video data generated by the electronic device and recorded by the terminal device and the authorization request to the server of the software.

15. The method according to claim 14, wherein the server of the software generates the authorization key corresponding to the electronic device according to the authorization request and the audio/video data, and notifies a television program service provider to embed the authorization key in an audio/video data stream of a television program; the smart television or the STB receives the audio/video data stream of the television program pushed by the television program service provider, and acquires the authorization key from the audio/video data stream of the television program, so as to authorize the software in the electronic device.

16. A system for authorizing software, the system comprising an electronic device without an Ethernet function, a terminal device having the Ethernet function and a server of the software; wherein the electronic device without the Ethernet function is built in with the software; when the system is to authorize the software in the electronic device without the Ethernet function, the system performs steps of:
  recording audio/video data, by the electronic device;
  generating and sending, by the electronic device, at least one section of the audio/video data comprising a unique identifier (UID) corresponding to the electronic device, to the terminal device, wherein the audio/video data is embedded with the UID corresponding to the electronic device;
  communicating with the server of the software through the terminal device to upload the audio/video data and to send an authorization request to the server of the software;
  returning authorization audio/video data from the server of the software through the terminal device, wherein the authorization audio/video data comprises an authorization key corresponding to the electronic device and the authorization key is generated according to the authorization request and the audio/video data; and
  acquiring the authorization audio/video data through audio/video communication, by the electronic device, to acquire the authorization key, and authorizing the software in the electronic device.

17. The system according to claim 16, wherein the electronic device without the Ethernet function is a video camera device.

18. The system according to claim 17, wherein the video camera device is connected by a wired or wireless means to the terminal device, so as to enable the terminal device to acquire at least one section of the audio/video data recorded by the video camera device; or the video camera device is connected by a wired or wireless means to a monitoring device to enable the monitoring device to acquire the audio/video data recorded by the video camera device, and the terminal device re-records audio/video played by the monitoring device to acquire at least one section of the audio/video data recorded by the video camera device.

19. The system according to claim 18, wherein the terminal device receives the authorization audio/video data sent from the server of the software, and the authorization audio/video data is an image having a two-dimensional code or a barcode; when the image is displayed on the electronic device or printed out, the video camera device captures the image on the electronic device or printed out to acquire the authorization key.

20. The system according to claim 16, wherein the electronic device without the Ethernet function is a smart television or a set-up box (STB), wherein the smart television or the STB embeds the UID corresponding to the smart television or the STB in audio/video played by the smart television or a television corresponding to the STB.

21. The system according to claim 20, wherein:
  the terminal device records the audio/video played by the smart television or the television corresponding to the STB to acquire the at least one section of audio/video data generated by the electronic device;
  after the electronic device uploads the at least one section of audio/video data generated by the electronic device and recorded by the terminal device and the authorization request to the server of the software, the server of the software generates the authorization key corresponding to the electronic device according to the authorization request and the audio/video data, and notifies a television program service provider to embed the authorization key in an audio/video data stream of the television program; and the smart television or the STB receives the audio/video data stream of the television program pushed by the television program service provider, and acquires the authorization key from the audio/video data stream of the television program, so as to authorize the software in the smart television or the STB.

* * * * *